(12) United States Patent
Hagiwara et al.

(10) Patent No.: US 12,162,083 B2
(45) Date of Patent: Dec. 10, 2024

(54) CUTTER

(71) Applicant: MITSUBISHI MATERIALS CORPORATION, Tokyo (JP)

(72) Inventors: Takayuki Hagiwara, Tokyo (JP); Shigeru Ishimori, Tokyo (JP); Hidehiko Nagaya, Tokyo (JP); Hiroshi Hoki, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 661 days.

(21) Appl. No.: 17/421,246

(22) PCT Filed: Mar. 14, 2019

(86) PCT No.: PCT/JP2019/010605
§ 371 (c)(1),
(2) Date: Jul. 7, 2021

(87) PCT Pub. No.: WO2020/183715
PCT Pub. Date: Sep. 17, 2020

(65) Prior Publication Data
US 2022/0118532 A1     Apr. 21, 2022

(51) Int. Cl.
*B23C 5/20*     (2006.01)
*B23C 5/26*     (2006.01)

(52) U.S. Cl.
CPC . *B23C 5/20* (2013.01); *B23C 5/26* (2013.01)

(58) Field of Classification Search
CPC ......... B23C 5/20; B23C 2240/24; B23C 5/26; B23B 31/11
See application file for complete search history.

(56) References Cited

U.S. PATENT DOCUMENTS

| | | | | |
|---|---|---|---|---|
| 2,369,273 A | * | 2/1945 | Bakewell | B23G 5/20 408/233 |
| 2,807,443 A | * | 9/1957 | Wyman | E21B 10/38 175/426 |

(Continued)

FOREIGN PATENT DOCUMENTS

| | | |
|---|---|---|
| CN | 107457440 A | 12/2017 |
| DE | 102015005776 A1 | 11/2016 |

(Continued)

OTHER PUBLICATIONS

International Search Report mailed Jun. 18, 2019 for the corresponding PCT International Patent Application No. PCT/JP2019/010605.

(Continued)

*Primary Examiner* — Sara Addisu
(74) *Attorney, Agent, or Firm* — Leason Ellis LLP; Melvin C. Garner; Mitsuhiro Haraguchi

(57) ABSTRACT

A cutter includes: a cutter main body rotated; and cutting edges disposed on an outer periphery of a front of the cutter main body, wherein a mounting hole penetrating through the cutter main body is formed, an opening portion opening in a front of the cutter main body, a housing portion provided on a rear of the opening portion to house a head portion of a headed bolt, and a female thread portion are formed in the mounting hole, a mounting part including a male thread portion in an outer periphery is mounted to the female thread portion, the male thread portion screwable to the female thread portion, and a through hole having a smaller inner diameter than the head portion is formed in the mounting part.

9 Claims, 15 Drawing Sheets

(56) References Cited

U.S. PATENT DOCUMENTS

| | | | | |
|---|---|---|---|---|
| 3,758,125 | A * | 9/1973 | Cornelia | B23B 31/1078 279/904 |
| 4,325,664 | A * | 4/1982 | Mori | B23C 5/2278 409/234 |
| 4,843,709 | A * | 7/1989 | Ide | B23C 5/26 409/234 |
| 4,964,762 | A * | 10/1990 | Arai | B23B 31/11 407/34 |
| 11,583,941 | B2 * | 2/2023 | Chang | B23C 3/12 |
| 2005/0129475 | A1 | 6/2005 | Ripley et al. | |
| 2007/0104549 | A1 * | 5/2007 | Hecht | B23D 77/006 408/233 |
| 2011/0262232 | A1 * | 10/2011 | Chen | B23C 5/109 407/46 |
| 2012/0141220 | A1 * | 6/2012 | Chen | B23Q 11/1023 409/136 |
| 2012/0201629 | A1 * | 8/2012 | Dudzinsky | B23C 5/26 411/411 |
| 2014/0117630 | A1 * | 5/2014 | Buschbeck | B23B 31/261 279/66 |
| 2016/0039016 | A1 * | 2/2016 | Waggle | B23C 5/006 407/11 |
| 2018/0009042 | A1 * | 1/2018 | Chen | B23B 31/11 |
| 2021/0220956 | A1 * | 7/2021 | Fang | B23C 5/28 |
| 2022/0324037 | A1 * | 10/2022 | Gangstad | B23C 5/006 |
| 2023/0102426 | A1 * | 3/2023 | Haimer | B23B 31/4073 409/135 |

FOREIGN PATENT DOCUMENTS

| | | |
|---|---|---|
| JP | 56038743 U | 4/1981 |
| JP | 64050010 U | 3/1989 |
| JP | 64050011 U | 3/1989 |
| JP | 05-200618 A | 8/1993 |
| JP | 06190621 A | 7/1994 |
| JP | 2503842 B | 6/1996 |
| JP | 10202414 A | 8/1998 |
| JP | 2001162430 A | 6/2001 |
| JP | 2010253656 A | 11/2010 |
| JP | 5307619 B | 10/2013 |
| JP | 2015217511 A | 12/2015 |
| JP | 2019-042882 A | 3/2019 |

OTHER PUBLICATIONS

Japanese Notice of Allowance mailed May 10, 2022 for the corresponding Japanese Patent Application No. 2017-169778, 4 pages including English translation.

* cited by examiner

CUTTER

CROSS-REFERENCE TO RELATED PATENT APPLICATIONS

This application is a U.S. National Phase Application under 35 U.S.C. § 371 of International Patent Application No. PCT/JP2019/010605 filed on Mar. 14, 2019, the content of which is incorporated herein by reference in its entirety. The International Application was published in Japanese on Sep. 17, 2020 as International Publication No. WO/2020/183715 under PCT Article 21(2).

FIELD OF THE INVENTION

The present invention relates to a cutter in which cutting edges are disposed on an outer periphery of a front portion of a cutter main body rotating around an axis.

BACKGROUND OF THE INVENTION

In the related art, in order to mount such a cutter to an arbor, generally, a headed bolt (set bolt) is inserted into a through hole, which is provided along an axis of a cutter main body, to be screwed and mounted into a thread hole provided in a front portion of the arbor. However, in this case, a counterbore which houses a head portion of the headed bolt has to be provided in a front portion of the cutter main body, and particularly, in the case of a cutting edge replaceable cutter or the like, the counterbore interferes with an insert mounting seat, so that it is difficult to cope with a reduction in size of the cutter.

Therefore, for example, Japanese Patent Publication No. 2503842 (B) has proposed a cutter including a cutter main body that is mounted to a front portion of a tool mounting shaft (arbor) in alignment with an axial center, and a threaded rod that directly fixes the cutter main body to the tool mounting shaft. A relief groove having an annular shape is provided in a central portion of the threaded rod in a longitudinal direction. One end side of the relief groove is provided with a first male thread that is screwed together with a thread hole provided in a tip surface of the tool mounting shaft, and the other end side of the relief groove is provided with a second male thread that has substantially the same diameter as that of the first male thread and is a reverse thread. The cutter main body is provided with a thread hole that is screwed together with the second male thread of the threaded rod.

In addition, Japanese Patent Publication No. 5307619 (B) has proposed a cutting edge replaceable cutting tool in which cutting inserts are detachably mounted to an outer peripheral portion on a tip side in an axial direction of a tool main body rotating around an axial center line, and a rear end side in the axial direction of the tool main body is mounted to an arbor with a mounting bolt. The mounting bolt is used of which a bolt head portion is provided with a tightening hole portion, and a central portion on the rear end side in the axial direction of the tool main body is provided with a guidance and housing hole portion that guides the bolt head portion of the mounting bolt from the rear end side in the axial direction of the tool main body to house the bolt head portion. Holding means is provided which holds the mounting bolt in the guidance and housing hole portion in a state where the mounting bolt housed in the guidance and housing hole portion is rotatable, and a tightening hole having a smaller diameter than the bolt head portion of the mounting bolt is provided in the guidance and housing hole portion to penetrate therethrough from the tip side in the axial direction of the tool main body. When the mounting bolt is held in the guidance and housing hole portion by the holding means, an insertion hole is provided in a central portion of a clamp part in which a flat surface has a non-circular shape which is placed on the bolt head portion of the mounting bolt housed in the guidance and housing hole portion, and a bolt shaft of the mounting bolt is inserted into the insertion hole, so that the clamp part having a non-circular shape is housed in the guidance and housing hole portion. The clamp part is rotated, so that the clamp part is locked to a locking portion provided inside the guidance and housing hole portion, and a rotation restraining part which restrains the rotation of the clamp part locked to the locking portion is housed in the guidance and housing hole portion. The rotation restraining part is fixed inside the guidance and housing hole portion with a screw part.

CITATION LIST

[Patent Document 1]
Japanese Patent Publication No. 2503842 (B)
[Patent Document 2]
Japanese Patent Publication No. 5307619 (B)

Technical Problem

In the cutter described in Japanese Patent Publication No. 2503842 (B), the threaded rod does not require a head portion. Therefore, a counterbore which houses the head portion does not need to be provided in a front end of the cutter main body, so that even in a cutting edge replaceable cutter having a small diameter, there is no interference between the counterbore and an insert mounting seat. However, in the cutter described in Japanese Patent Publication No. 2503842 (B), the second male thread of the threaded rod and the thread hole of the cutter main body, which press and tighten the cutter main body against and to the arbor, have substantially the same diameter as that of the first male thread and the thread hole of the arbor, and are at a position close to an axis of the cutter main body, so that it is difficult to secure a large pressing force and loosening is likely to occur, which is a problem.

Meanwhile, in the cutter described in Japanese Patent Publication No. 5307619 (B), four types of components such as the mounting bolt, the clamp part as the holding means, the rotation restraining part, and the screw part are required to mount the cutter main body to the arbor, and the management of the components is complicated, and a component loss is also likely to occur. In addition, a milling task or the like has to be performed so as to provide the locking portion in the guidance and housing hole portion, and the production process of the cutter main body is complicated, which is inefficient and uneconomical.

The present invention has been made under such a background, and an object of the present invention is to provide a cutter, even a cutting edge replaceable cutter having a small diameter, in which a cutter main body can be reliably mounted to an arbor without increasing the number of components required to mount the cutter main body to the arbor or complicating the production process of the cutter main body.

SUMMARY OF THE INVENTION

Solution to Problem

In order to solve the above problems and achieve such an object, according to an aspect of the present invention, there is a cutter including: a cutter main body configured to be rotated around an axis; and cutting edges disposed on an outer periphery of a front portion of the cutter main body, wherein a mounting hole is formed in a central portion of the cutter main body, the mounting hole penetrating through the cutter main body along the axis, an opening portion that is open in a front end of the cutter main body, a housing portion that is provided on a rear end side of the opening portion to house a head portion of a headed bolt, and a female thread portion of which an inner peripheral portion is threaded are formed in the mounting hole, a mounting part including a male thread portion in an outer peripheral portion is mounted to the female thread portion, the male thread portion being configured to be screwable to the female thread portion, and a through hole having a smaller inner diameter than the head portion is formed in the mounting part, a thread portion of the headed bolt being insertable in a state where the head portion is housed in the housing portion.

In the cutter having such a configuration, since the head portion of the headed bolt (set bolt) is provided with an engaging recessed portion with which a work tool such as a hexagonal wrench having a shaft shape engages, the headed bolt can be rotated by an operation from the opening portion of the mounting hole, so that the headed bolt which is rotated in such a manner is screwed into a thread hole provided in a front portion of an arbor, and the head portion presses and fix the cutter main body against and to the front portion of the arbor via the mounting part.

Therefore, it is sufficient only that the front end of the cutter main body is provided with the opening portion having a smaller diameter than the housing portion which houses the head portion of the headed bolt, and even in a cutting edge replaceable cutter having a small diameter, interference between an insert mounting seat and the mounting hole can be avoided. In addition, since a minimum number of only two components, specifically, the headed bolt and the mounting part are required to mount the cutter main body to the arbor, the management of the components can be avoided from being complicated, and for the mounting part to be mounted to the cutter main body, it is sufficient only that the female thread portion is provided, so that the production process of the cutter main body is not also complicated.

Then, in the cutter having the above configuration, as described above, the head portion having a larger diameter than the thread portion of the headed bolt presses the cutter main body against the front portion of the arbor via the mounting part. Namely, since the head portion having a larger diameter than the thread portion or the thread hole of the arbor into which the thread portion is screwed presses the cutter main body via the mounting part at a position away from the axis of the cutter main body, a large pressing force can be secured to prevent the headed bolt from loosening, so that the cutter main body can be reliably fixed and mounted to the arbor.

Here, even if the headed bolt can be prevented from loosening in such a manner, if the male thread portion of the mounting part which presses the cutter main body and the female thread portion of the mounting hole are loosened by the headed bolt, as a result, the cutter main body cannot be reliably mounted to the arbor. Therefore, in order to prevent such loosening of the mounting part, it is desirable that a flat surface portion parallel to the axis is provided in the mounting part, and an anti-rotation screw which can come into contact with the flat surface portion is screwed into the cutter main body to restrict the rotation of the mounting part.

In addition, when the entirety of the mounting part is housed in the mounting hole, and a portion of the mounting hole on a rear end side of the mounting part is provided as an insertion portion into which a front protruding portion provided in the front portion of the arbor is inserted, the entire length of the cutter main body in the direction of the axis can be shortened, particularly in the case of a cutter having a small diameter, high rigidity can be secured, and the mounting strength with respect to the arbor can also be improved, so that high processing accuracy can be obtained.

Incidentally, in this case, the female thread portion of the mounting hole and the male thread portion of the mounting part have a thread pitch smaller than the thread pitch of the thread portion of the headed bolt, or are screwed in a direction opposite to a direction in which the thread portion of the headed bolt is screwed. Therefore, when the cutter main body is mounted to the arbor, the loosening of the mounting part due to the rotation of the headed bolt can be more reliably prevented.

Meanwhile, an outer peripheral portion of a rear end of the mounting part may be formed in a flange shape which projects to a rear end surface of the cutter main body, and exposed to the outside from between the rear end surface and the tip surface of the arbor. In this case, when an inner peripheral portion of the rear end of the mounting part is provided as an insertion portion which communicates with the through hole and into which a front protruding portion of an arbor is inserted, and the male thread portion is provided on an outer peripheral side of the insertion portion, the male thread portion and the female thread portion of the mounting hole to which the male thread portion is screwed can be made to have a large diameter, so that the mounting part can be more stably mounted.

In addition, in this case, the female thread portion of the mounting hole and the male thread portion of the mounting part are screwed in the same direction as a rotation direction of the cutter main body during cutting, toward a rear end side in a direction of the axis. Therefore, even when a cutting load is applied to the mounting part, of which the outer peripheral portion of the rear end which has a flange shape is interposed between the rear end surface of the cutter main body and the tip surface of the arbor, in a direction opposite to the rotation direction of the cutter main body, the mounting part can be prevented from loosening.

Advantageous Effects of Invention

As described above, according to the present invention, for example, even in a cutting edge replaceable cutter having a small diameter, the cutter main body can be reliably mounted to the arbor without increasing the number of components required to mount the cutter main body or complicating the production process of the cutter main body.

DETAILED DESCRIPTION OF THE INVENTION

Figure 1:
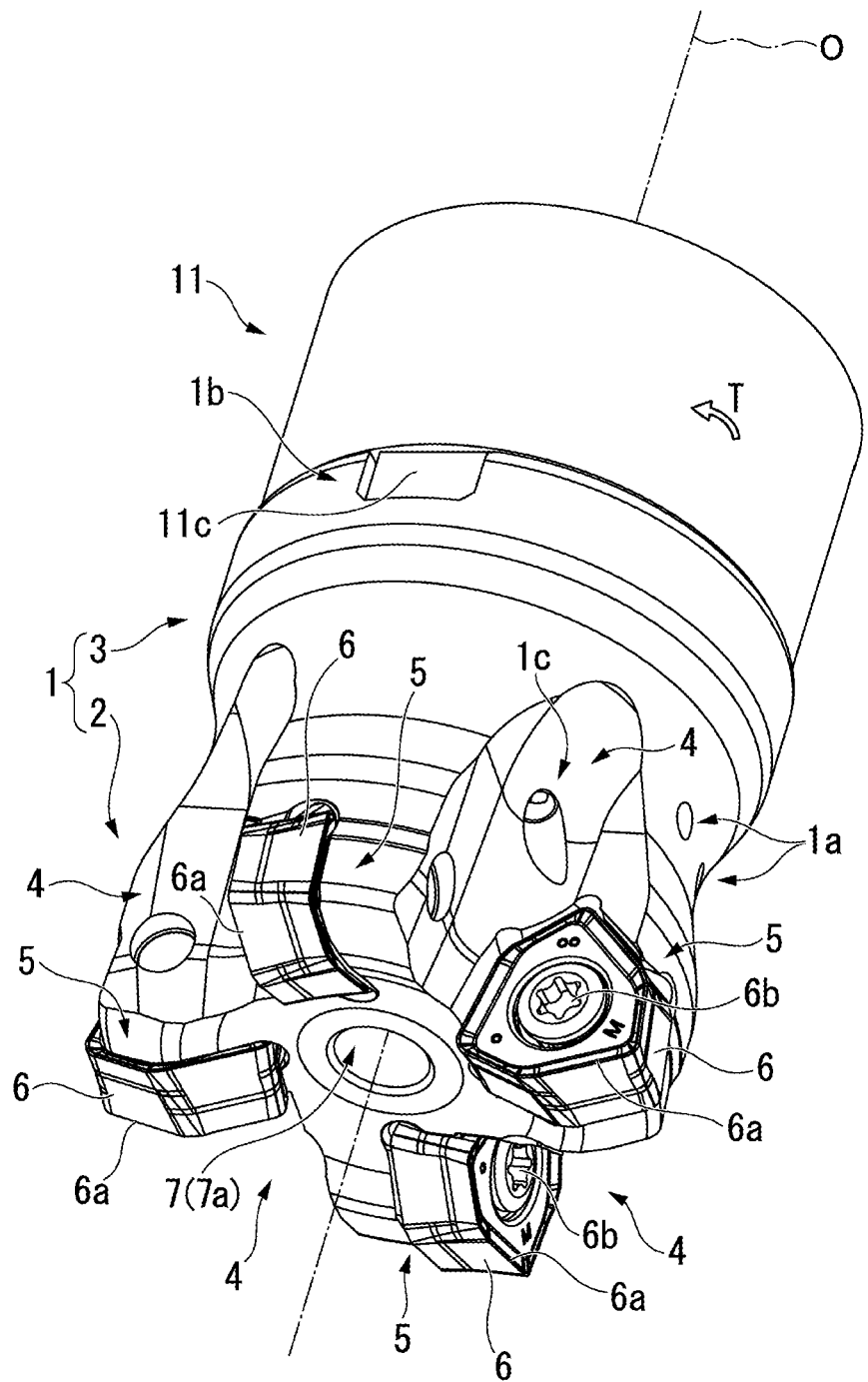
FIG. 1 is a perspective view of a first embodiment of the present invention in which a cutter main body is mounted to a front portion of an arbor.
Figure 2:
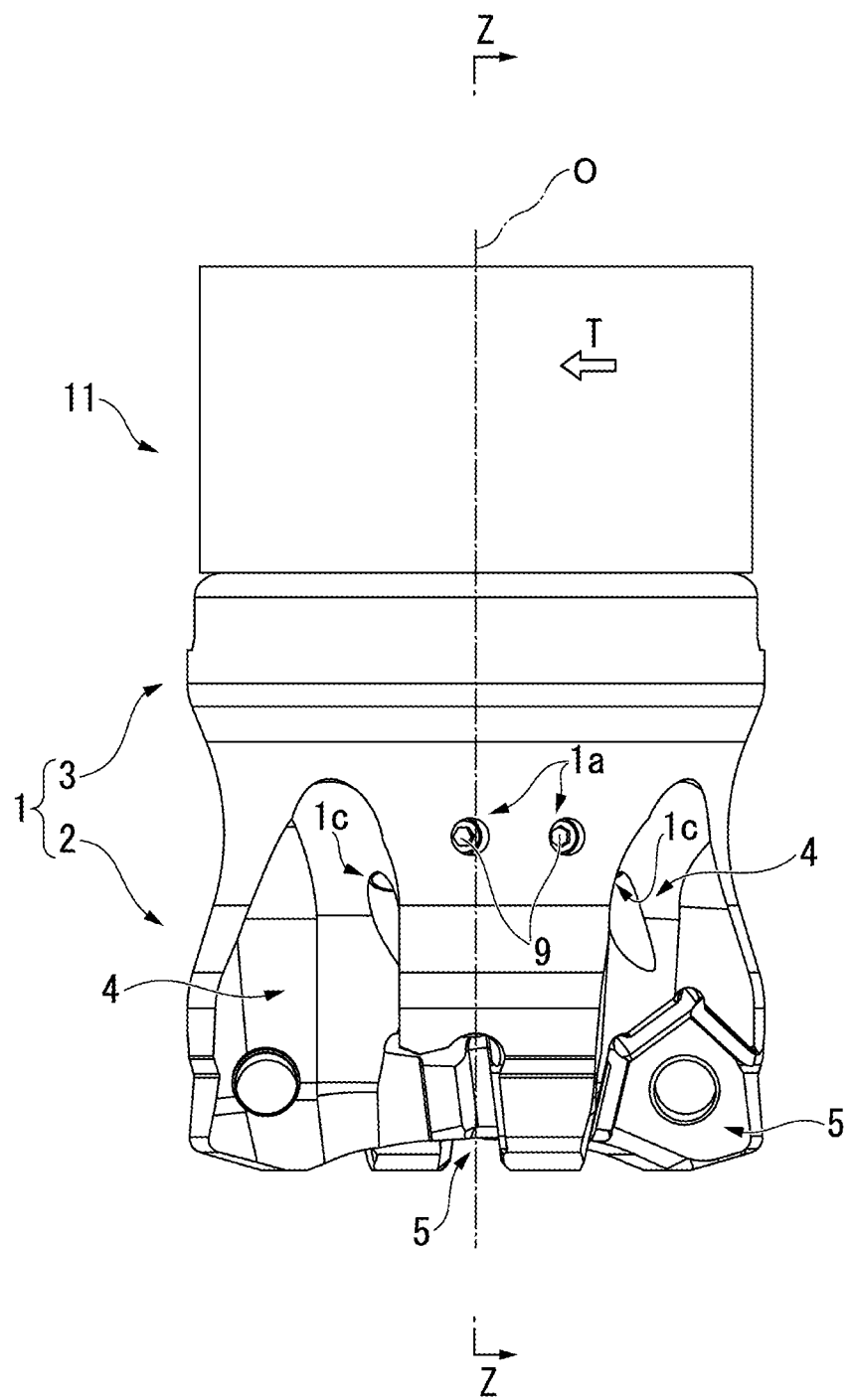
FIG. 2 is a side view of the embodiment shown in FIG. 1 (here, cutting inserts are not shown).
Figure 3:
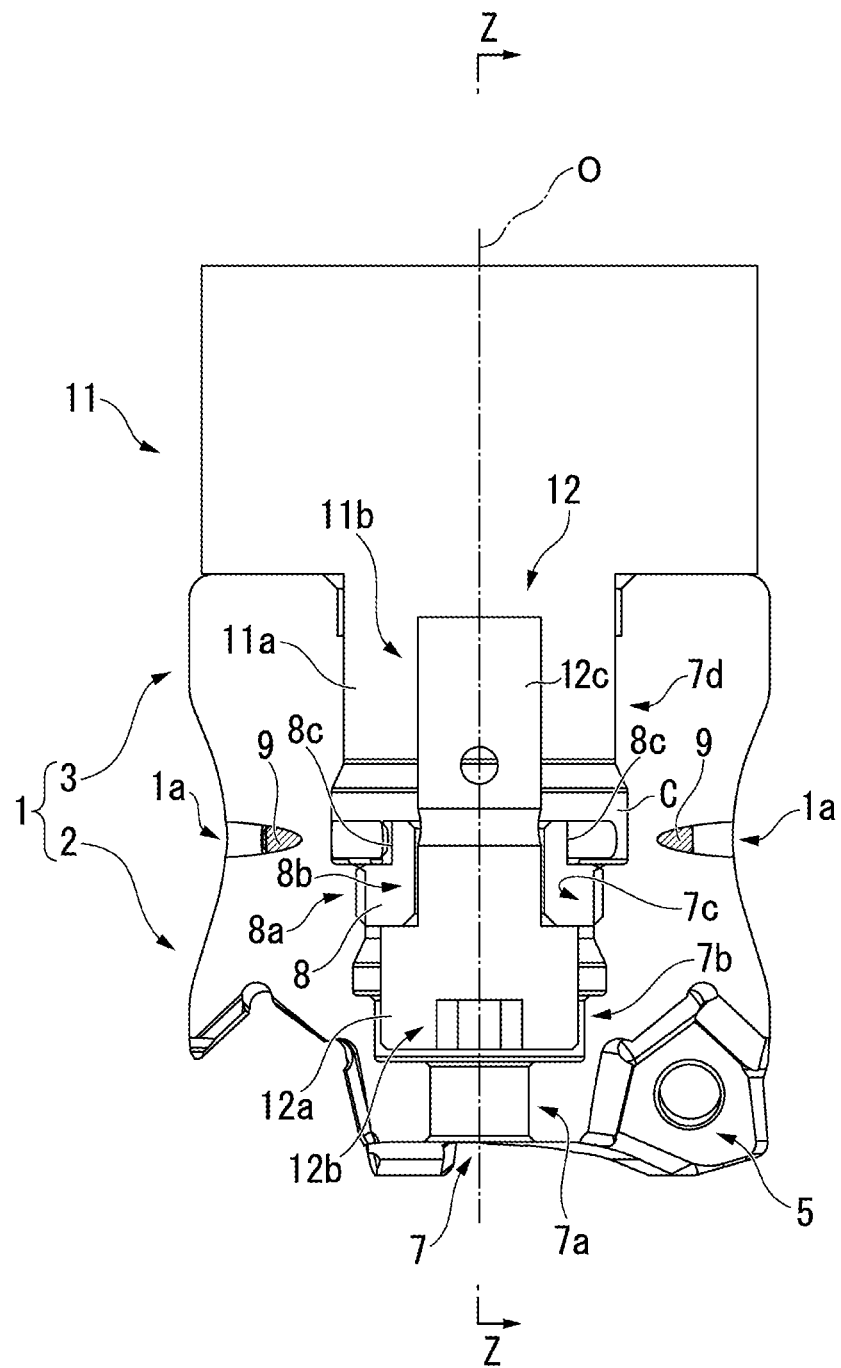
FIG. 3 is a sectional view taken along line Z-Z in FIG. 2 (here, the cutting inserts are not shown).
Figure 4:
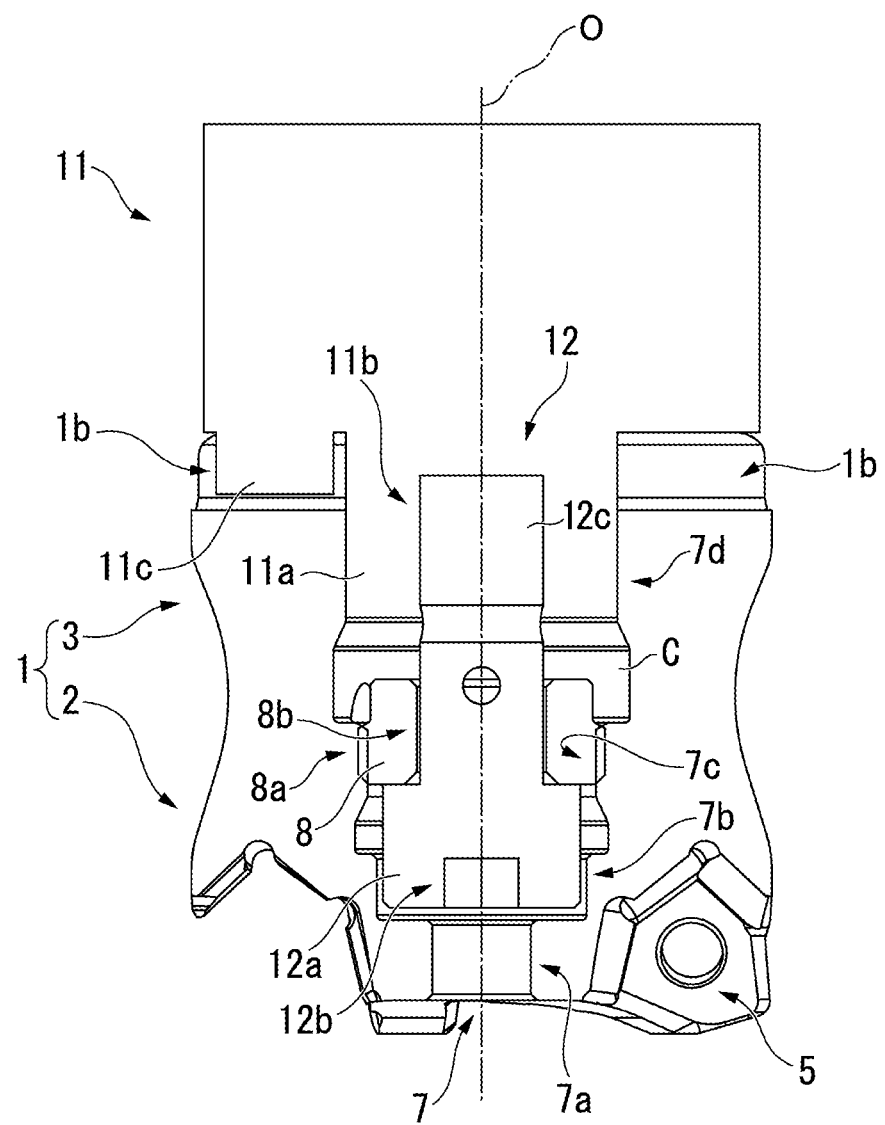
FIG. 4 is a sectional view taken along line Z-Z in FIG. 3 (here, the cutting inserts are not shown).
Figure 5:
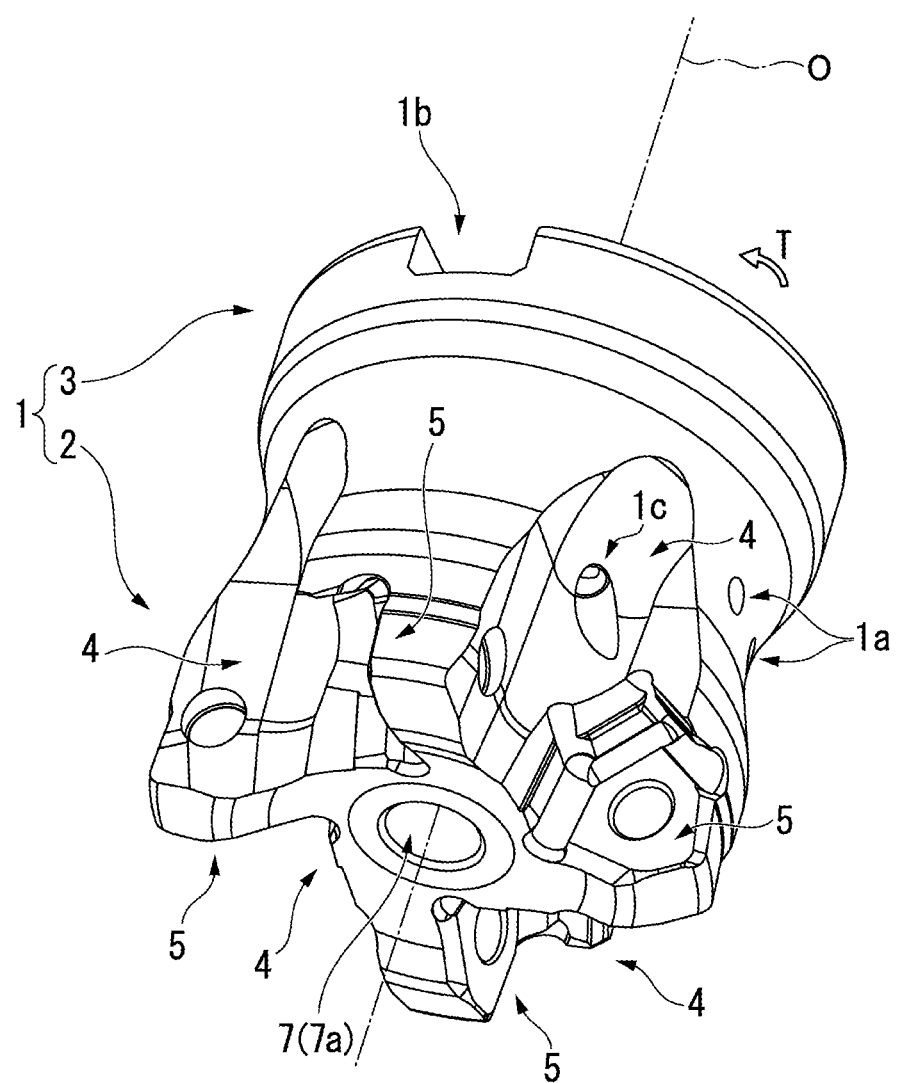
FIG. 5 is a perspective view of the cutter main body of the embodiment shown in FIG. 1.
Figure 6:
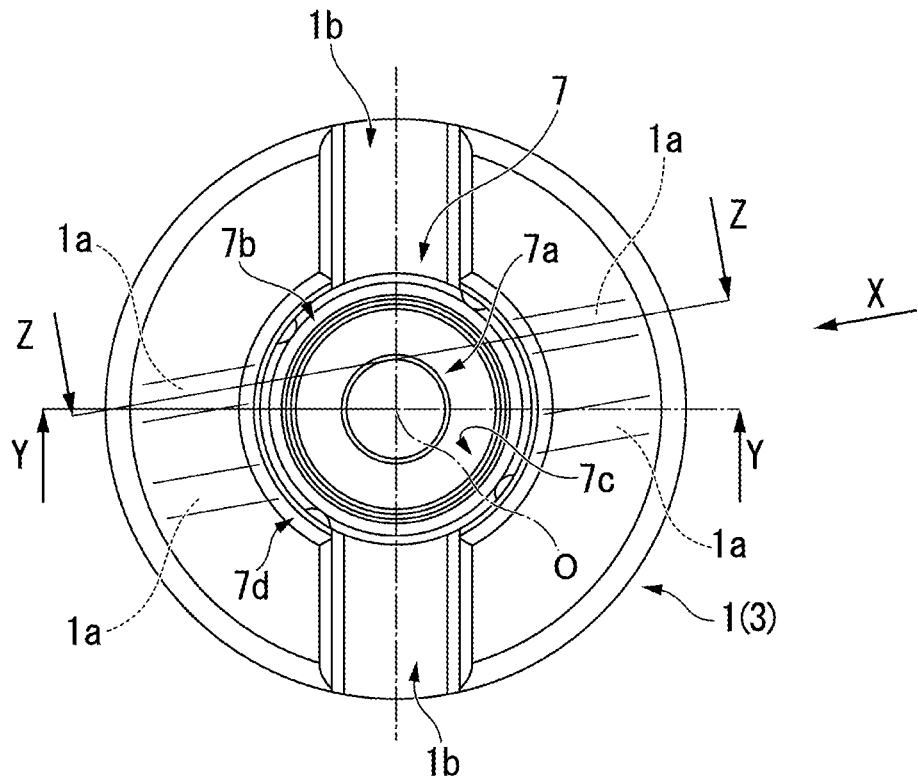
FIG. 6 is a plan view of a rear end surface of the cutter main body shown in FIG. 5.
Figure 7:
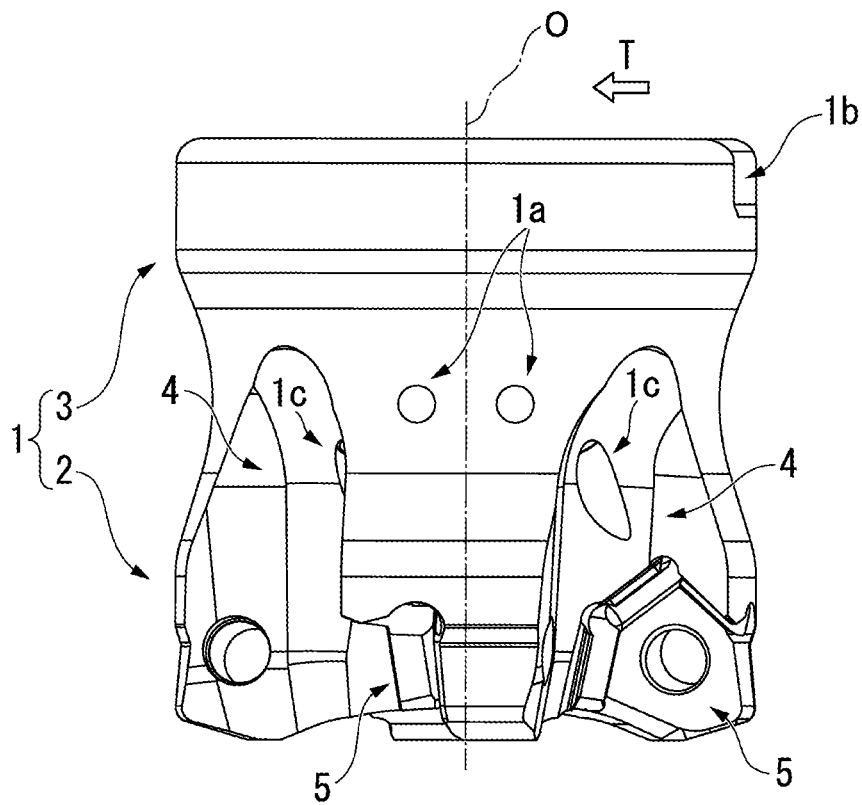
FIG. 7 is a side view as seen in an arrow X direction in FIG. 6.
Figure 8:
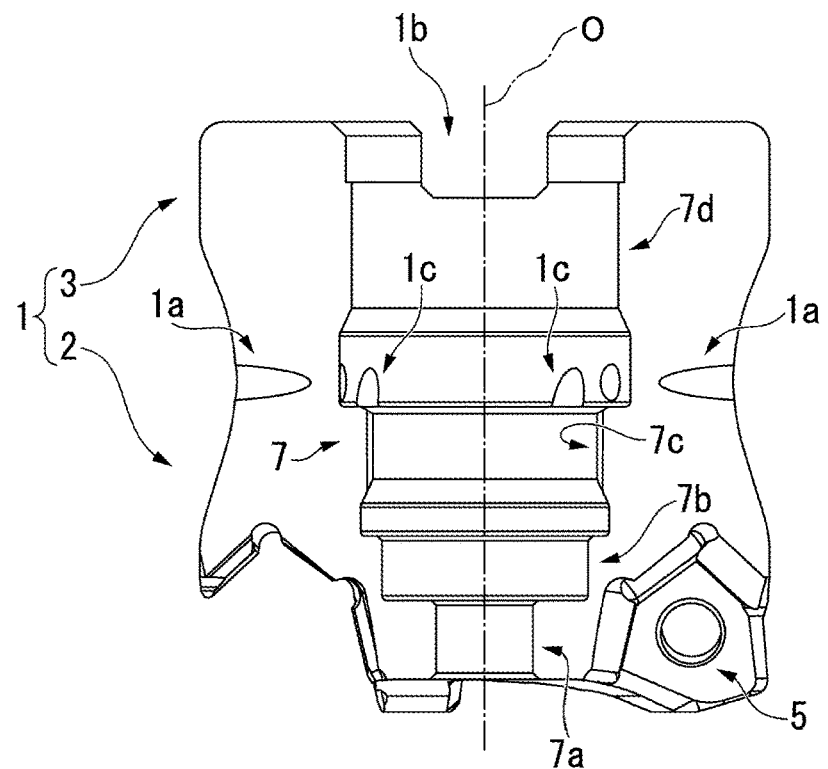
FIG. 8 is a sectional view taken along line Y-Y in FIG. 6.
Figure 9:
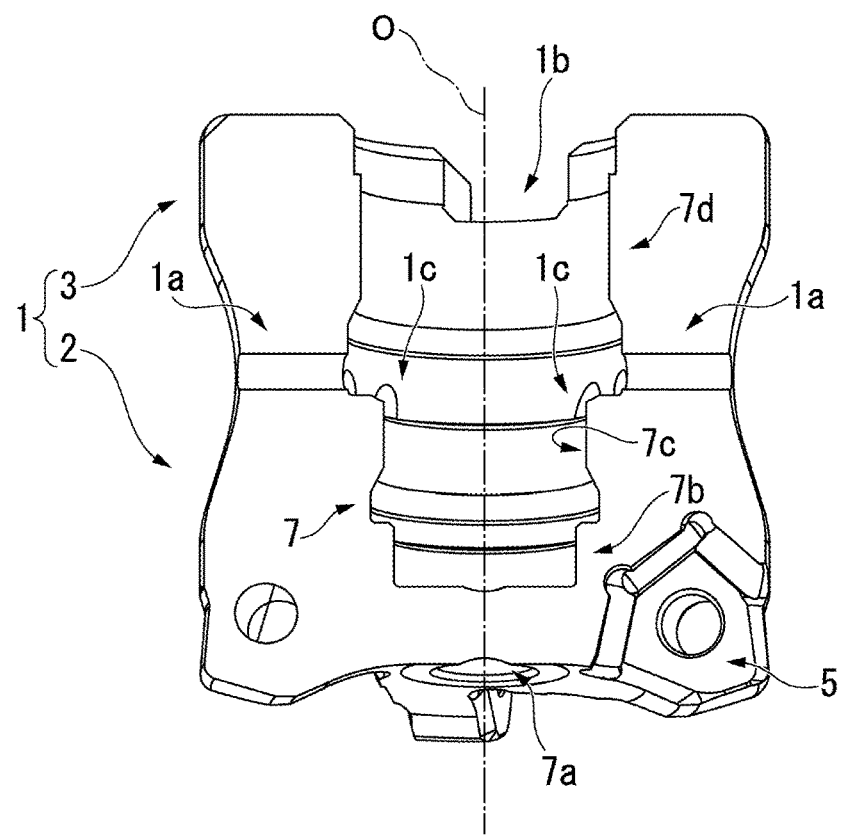
FIG. 9 is a sectional view taken along line Z-Z in FIG. 6.

FIGS. 1 to FIG. 10C show a first embodiment of the present invention. A cutter main body 1 in the present embodiment is formed from a metallic material such as steel in a substantially columnar shape which has an axis O as a center and of which a central portion in the direction of the axis O is constricted. A front portion (lower portion in FIGS. 1 to 4) of the cutter main body 1 is a cutting edge portion 2, and a rear end portion is a mounting portion 3 mounted to an arbor 11. Such a cutter is configured such that the arbor 11 mounted to the mounting portion 3 is held by a main spindle of a machine tool, and is fed in a direction intersecting the axis O while rotating around the axis O in a cutter rotation direction T, and thus a work material is cut by cutting edges disposed in the cutting edge portion 2.

A front portion of the arbor 11 is formed in a columnar shape, and a central portion of a tip surface is provided with a front protruding portion 11a having the same columnar shape which is coaxial with and has a smaller diameter than a column formed by the arbor 11. A thread hole 11b into which a headed bolt 12 for mounting the cutter main body 1 to the arbor 11 is to be screwed is provided in the front protruding portion 11a to be open at the center of a tip surface of the front protruding portion 11a. In addition, the tip surface of the arbor 11 is provided with a pair of keys 11c which are slightly at a distance from an outer peripheral surface of the front protruding portion 11a to extend to an outer peripheral side in a diameter direction.

A plurality (four in the present embodiment) of chip pockets 4 extending from a tip of the cutting edge portion 2 toward a rear end side are provided on an outer periphery of the front portion of the cutter main body 1 to be at a distance from each other in a circumferential direction. Insert mounting seats 5 are provided in outer peripheral portions of tips of wall surfaces of the respective chip pockets 4, the wall surfaces facing the cutter rotation direction T, and cutting inserts 6 each including a cutting edge 6a are detachably mounted to the respective insert mounting seats 5 with clamp screws 6b. Namely, the cutter of the present embodiment is a cutting edge replaceable cutter in which the cutting edges 6a disposed on the outer periphery of the front portion of the cutter main body 1 are provided in the respective cutting inserts 6.

Meanwhile, a mounting hole 7 penetrating through the cutter main body 1 along the axis O is provided in a central portion of the cutter main body 1 inside the cutter main body 1. The mounting hole 7 includes an opening portion 7a that is open in a front end of the cutter main body 1, a housing portion 7b that is provided on a rear end side of the opening portion 7a to be able to house a head portion 12a of the headed bolt 12, and a female thread portion 7c of which the inner peripheral portion is threaded. Incidentally, the head portion 12a of the headed bolt 12 has a disk shape, and a tip surface of the head portion 12a is provided with an engaging recessed portion 12b which has a regular hexagonal cross section or the like and with which a work tool such as a hexagonal wrench having a shaft shape engages.

In the present embodiment, the opening portion 7a and the housing portion 7b each have a circular cross section. The inner diameter (diameter) of the opening portion 7a is smaller than that of the housing portion 7b, and the diameter of the opening portion 7a is sized such that the work tool having a shaft shape can be inserted into the opening portion 7a, namely, is slightly larger than the diameter of a circumscribed circle of the engaging recessed portion 12b of the headed bolt 12 and smaller than the outer diameter of the head portion 12a. In addition, the inner diameter of the housing portion 7b is sized such that the head portion 12a can be loosely mounted into a front portion on an opening portion 7a side, and the housing portion 7b extends at a constant inner diameter from the front portion toward the rear end side after being increased in diameter by one step, and then is gradually reduced in diameter to reach the female thread portion 7c.

Further, the inner diameter of the female thread portion 7c is sized such that the head portion 12a of the headed bolt 12 can pass through the female thread portion 7c, namely, is slightly larger than the inner diameter of the front portion of the housing portion 7b. In addition, on a rear end side of the female thread portion 7c, similar to the housing portion 7b, the mounting hole 7 extends to the rear end side at a constant inner diameter after being increased in diameter by one step, and then is gradually reduced in diameter to have a constant inner diameter again and be open in a rear end surface of the cutter main body 1. A portion of the mounting hole 7 which has a constant inner diameter and is open in the rear end surface is an insertion portion 7d which is sized such that the front protruding portion 11a of the arbor 11 can be mounted and inserted into the insertion portion 7d.

Figure 10A:
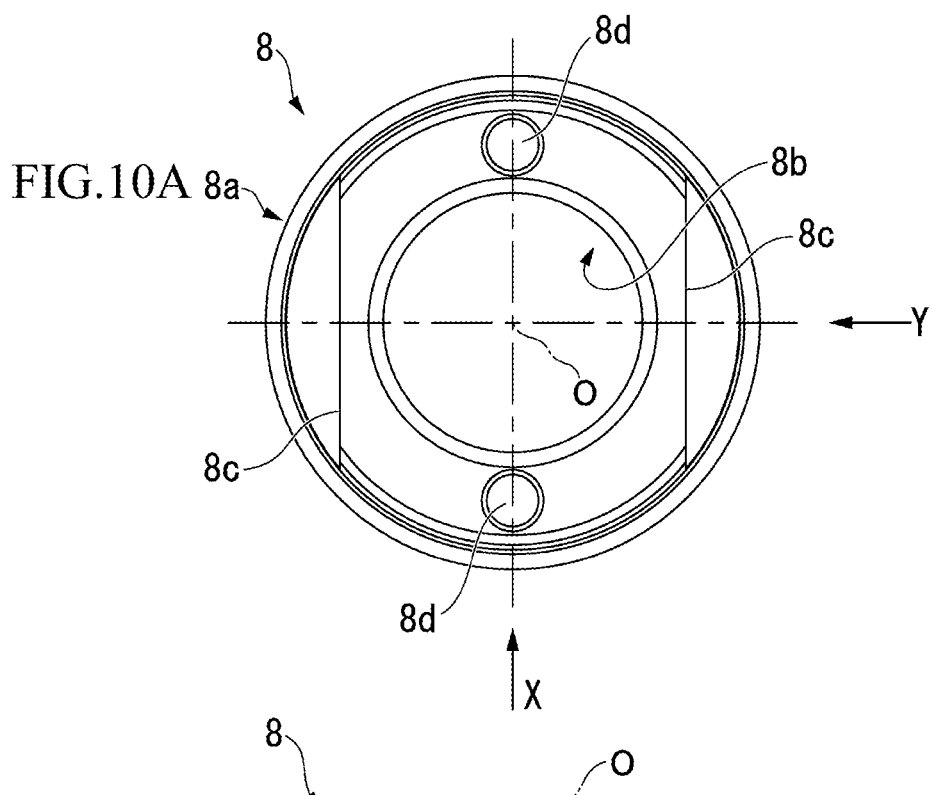
FIG. 10A is a plan view of a mounting part of the embodiment shown in FIG. 1.
Figure 10B:
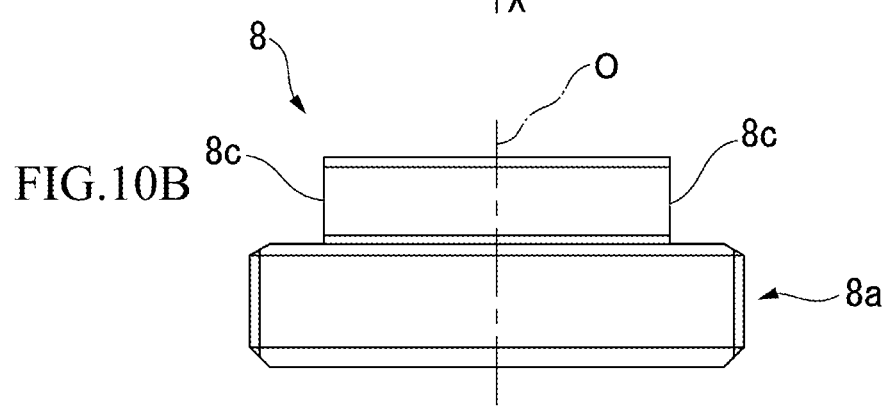
FIG. 10B is a side view as seen in an arrow X direction in FIG. 10A.
Figure 10C:
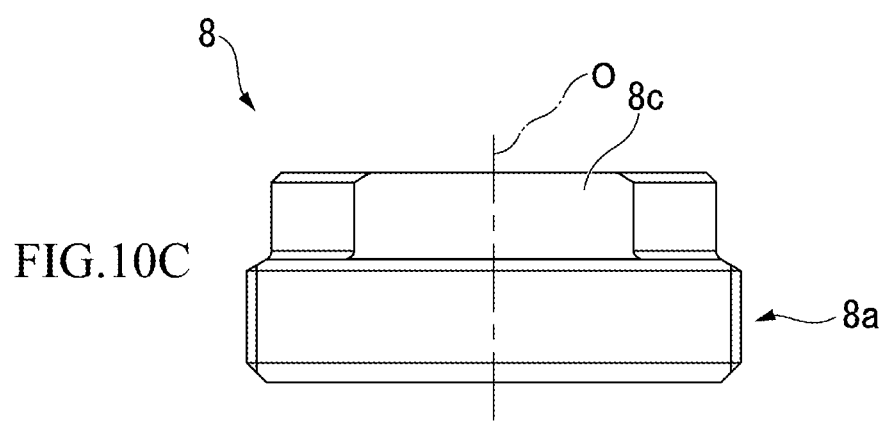
FIG. 10C is a side view as seen in an arrow Y direction in FIG. 10A.
Figure 11:
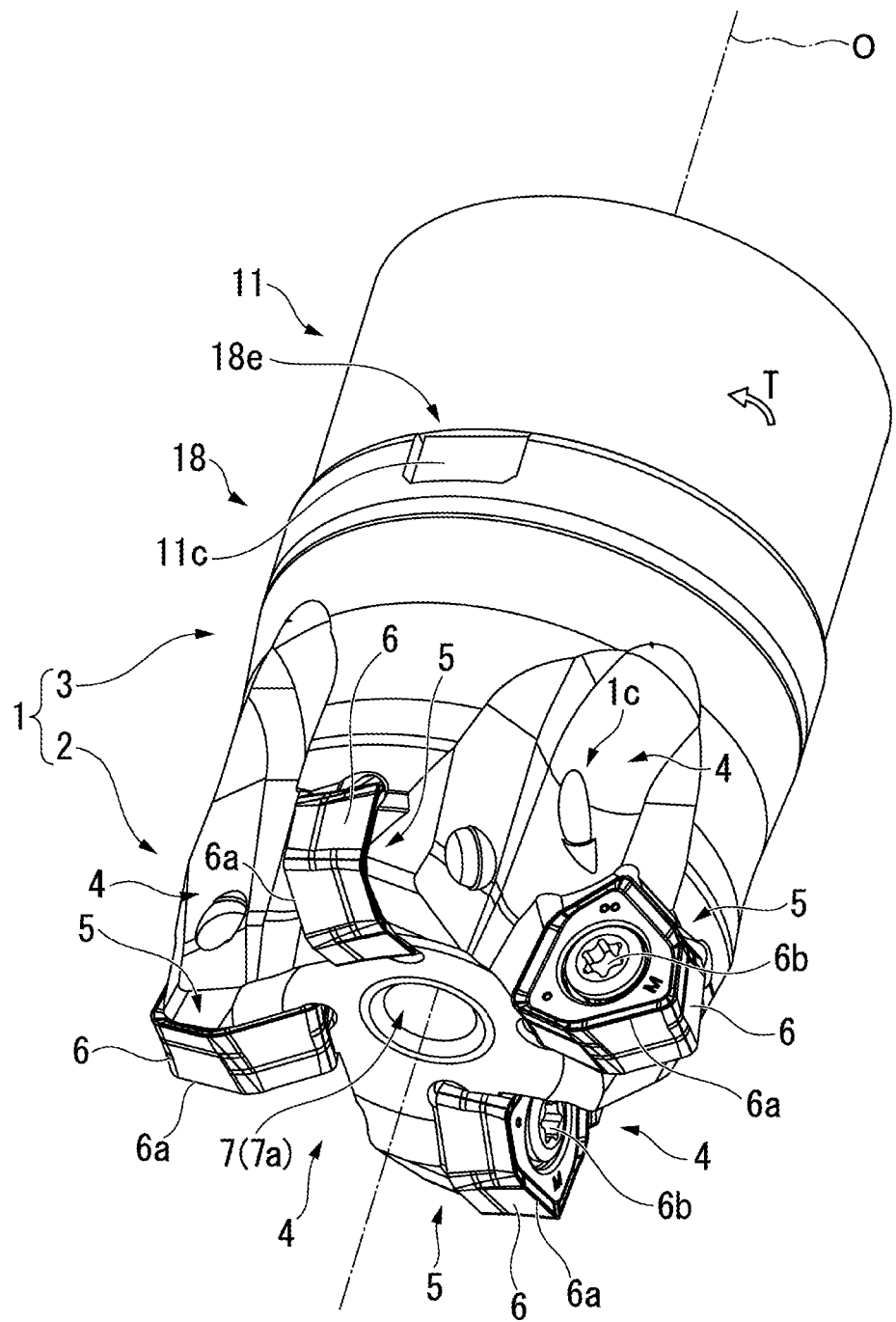
FIG. 11 is a perspective view of a second embodiment of the present invention in which a cutter main body is mounted to the front portion of the arbor.

Then, a mounting part 8 shown in FIGS. 10A-10C is screwed and mounted to the female thread portion 7c in a state where the head portion 12a of the headed bolt 12 is housed in the housing portion 7b. The mounting part 8 is formed in an annular shape from the same metallic material such as steel as that of the cutter main body 1. The outer diameter of a front portion (lower portion in FIGS. 10B and 10C) of the mounting part 8 is slightly one step larger than that of a rear end portion (upper portion in FIGS. 10B and 10C) of the mounting part 8. An outer peripheral portion of the front portion is provided with a male thread portion 8*a* to be screwed to the female thread portion 7*c*.

In addition, an inner peripheral portion of the mounting part 8 having an annular shape is a through hole 8*b* which has a smaller inner diameter than the head portion 12*a* and into which a thread portion 12*c* of the headed bolt 12 can be inserted in a state where the head portion 12*a* is housed in the housing portion 7*b* as described above. Incidentally, the female thread portion 7*c* of the mounting hole 7 and the male thread portion 8*a* of the mounting part 8 have a thread pitch smaller than the thread pitch of the thread portion 12*c* of the headed bolt 12, or the twist direction thereof is opposite to that of the thread portion 12*c* of the headed bolt 12.

Further, a pair of flat surface portions 8*c* are provided on an outer periphery of the rear end portion of the mounting part 8, the rear end portion having a slightly small diameter, so as to be parallel to each other and parallel to the axis O in a state where the mounting part 8 is mounted to the cutter main body 1. Furthermore, a pair of hole portions 8*d*, into which a U shaft-shaped front portion of a mounting jig not shown is inserted to rotate the mounting part 8 when the male thread portion 8*a* is screwed to the female thread portion 7*c* to cause the mounting part 8 to be mounted to the cutter main body 1, are provided in the rear end portion of the mounting part 8 so as to interpose the through hole 8*b* therebetween and be located in a diameter direction, which passes through the axis O to be parallel to the flat surface portions 8*c*, when seen from the rear end side, and are open in a rear end surface of the mounting part 8.

In a state where the head portion 12*a* of the headed bolt 12 is housed in the housing portion 7*b* of the mounting hole 7, the mounting part 8 is disposed directly above the female thread portion 7*c* while the thread portion 12*c* of the headed bolt 12 is inserted into the through hole 8*b*. Further, as described above, the U shaft-shaped front portion of the mounting jig is inserted into each of the hole portions 8*d* to rotate around the axis O, so that the male thread portion 8*a* is screwed and mounted to the female thread portion 7*c*. Therefore, the entirety of the mounting part 8 in the present embodiment is housed in the mounting hole 7.

Incidentally, in the cutter main body 1, two pairs of thread holes 1*a*, which extend in a direction orthogonal to the pair of flat surface portions 8*c* of the rear end portion of the mounting part 8 in a state where the mounting part 8 is mounted to the female thread portion 7*c* in such a manner, are provided at equal intervals from the axis O with the axis O interposed therebetween. Anti-rotation screws 9 of which each has a grub screw shape and can come into contact with the flat surface portion 8*c* are screwed into the thread holes 1*a* from the outer peripheral side. In addition, a rear end surface of the mounting portion 3 of the cutter main body 1 is provided with a pair of key grooves 1*b* into which the respective keys 11*c* of the tip surface of the arbor 11 can be mounted and inserted in a state where the front protruding portion 11*a* is mounted and inserted into the insertion portion 7*d* of the mounting hole 7.

Further, a hole portion not shown is provided from a rear end of the thread portion 12*c* of the headed bolt 12 along the axis O. The hole portion branches in the middle to be open in a space C that is formed between the tip surface of the front protruding portion 11*a* of the arbor 11 and the rear end surface of the mounting part 8 in the mounting hole 7. Meanwhile, the cutter main body 1 is provided with coolant holes 1*c* that extend from the space C to an outer peripheral side of the front end of the cutter main body 1 to be open in the respective chip pockets 4. A coolant supplied from the arbor 11 to the space C via the hole portion of the headed bolt 12 is sprayed to the cutting inserts 6.

In the cutter configured in such a manner, the thread portion 12*c* of the headed bolt 12 is disposed in the front portion of the arbor 11 in a state where as described above, the head portion 12*a* of the headed bolt 12 is housed in the housing portion 7*b* of the mounting hole 7, the mounting part 8 is screwed and mounted to the female thread portion 7*c*, the thread portion 12*c* protrudes from the rear end surface of the mounting part 8 into the insertion portion 7*d* of the mounting hole 7, and then the rotation of the mounting part 8 is restricted by the anti-rotation screws 9.

Then, the work tool is inserted from the opening portion 7*a* of the tip of the mounting hole 7 to engage with the engaging recessed portion 12*b* of the headed bolt 12, and rotates the headed bolt 12 to cause the thread portion 12*c* to be screwed into the thread hole 11*b* of the front protruding portion 11*a*. Therefore, the cutter main body 1 is pulled to the rear end side in the direction of the axis O via the mounting part 8 to cause the front protruding portion 11*a* to be inserted into the insertion portion 7*d* of the mounting hole 7 and cause the keys 11*c* to be mounted into the respective key grooves 1*b*, so that the rear end surface of the cutter main body 1 is pressed against and mounted to the tip surface of the arbor 11.

Incidentally, during screwing of the thread portion 12*c* of the headed bolt 12, the rotation of the mounting part 8 is restricted by the anti-rotation screws 9 in contact with the flat surface portions 8*c*, and the female thread portion 7*c* of the mounting hole 7 and the male thread portion 8*a* of the mounting part 8 have a thread pitch smaller than the thread pitch of the thread portion 12*c* of the headed bolt 12, or are screwed in a direction opposite to a direction in which the thread portion 12*c* is screwed, so that the mounting part 8 is prevented from rotating together with the rotation of the headed bolt 12.

In the cutter having the above configuration which is mounted to the tip of the arbor 11 in such a manner, the opening portion 7*a* which is open at the front end of the cutter main body 1 may have a smaller diameter than the housing portion 7*b* of the mounting hole 7 which houses the head portion 12*a* of the headed bolt 12, and be sized such that the work tool which engages with the engaging recessed portion 12*b* can be inserted into the opening portion 7*a*. Therefore, in the cutting edge replaceable cutter as in the present embodiment, even when the outer diameter of the cutting edge 6*a* of the cutting insert 6 from the axis O is small, interference between the mounting hole 7 and the insert mounting seat 5 can be prevented.

In addition, if the anti-rotation screw 9 is excluded, a minimum number of only two components, specifically, the headed bolt 12 and the mounting part 8 are required to mount the cutter main body 1 to the arbor 11, so that the management of the components can be avoided from being complicated. Moreover, for the mounting part 8 to be mounted to the mounting hole 7 of the cutter main body 1, it is sufficient only that the female thread portion 7*c* is provided in the cutter main body 1 and the male thread portion 8*a* of the mounting part 8 is screwed to the female thread portion 7*c*. Therefore, only the turning process using a boring tool and a threading tool is sufficient to provide the mounting hole 7 in the cutter main body 1, so that the production of the cutter main body 1 is not also complicated.

Then, further, in the cutter having the above configuration, as described above, the head portion 12*a* of the headed bolt 12 which has a larger diameter than the thread portion 12*c* presses the cutter main body 1 against the front portion of the arbor 11 via the mounting part 8, so that the cutter main body 1 is mounted to the arbor 11. Therefore, the head portion 12a of the headed bolt 12 presses the cutter main body 1 via the mounting part 8 at a position farther away from the axis O than the thread portion 12c, so that a large pressing force can be secured and the headed bolt 12 can be prevented from loosening. Therefore, the cutter main body 1 can be reliably fixed and mounted to the arbor 11.

Moreover, in the present embodiment, the flat surface portions 8c parallel to the axis O are provided in the mounting part 8, and the anti-rotation screws 9 which can come into contact with the flat surface portions 8c are screwed into the cutter main body 1. Accordingly, the rotation of the mounting part 8 can be restricted and the loosening can be prevented. In addition, in the present embodiment, the female thread portion 7c of the mounting hole 7 and the male thread portion 8a of the mounting part 8 have a thread pitch equal to or less than the thread pitch of the thread portion 12c of the headed bolt 12, or are screwed in the direction opposite to the direction in which the thread portion 12c of the headed bolt 12 is screwed. Accordingly, when the cutter main body 1 is mounted to the arbor 11, the rotation of the headed bolt 12 due to the loosening of the mounting part 8 can be prevented.

In addition, in the present embodiment, the entirety of the mounting part 8 which presses and fixes the cutter main body 1 against and to the arbor 11 in such a manner is housed in the mounting hole 7, and a portion of the mounting hole 7 on the rear end side of the mounting part 8 is the insertion portion 7d into which the front protruding portion 11a of the arbor 11 is inserted. Therefore, the entire length of the cutter main body 1 in the direction of the axis O can be shortened, particularly, in the case of a cutter having a small diameter, high rigidity can be secured, the front protruding portion 11a of the arbor 11 and in the present embodiment, the keys 11c can be directly mounted to the cutter main body 1, and mounting strength can also be improved, so that high processing accuracy can be obtained.

Meanwhile, in the first embodiment, the entirety of the mounting part 8 is housed in the mounting hole 7 in such a manner, but as in a second embodiment of the present invention shown in FIGS. 11 to 19, an outer peripheral portion of a rear end of a mounting part 18 may be formed in a flange shape which projects to the rear end surface of the cutter main body 1, and the mounting part 18 may be exposed to the outside from between the rear end surface of the cutter main body 1 and the tip surface of the arbor 11. In addition, in FIGS. 11 to 19, the same reference signs are assigned to the parts common to the first embodiment shown in FIGS. 1 to 10, and the description thereof will be omitted.

In the cutter main body 1 of the second embodiment, a portion of the mounting hole 7 on a rear end side of the housing portion 7b is a tapered portion 7e that is increased in diameter to the outer peripheral side by one step, extends at a constant inner diameter by a short length, and then is gradually increased in diameter toward the rear end side. The female thread portion 7c is provided on a rear end side of the tapered portion 7e. In addition, in the present embodiment, the key grooves 1b are not provided in the cutter main body 1, and the rear end surface of the cutter main body 1 is an annular surface perpendicular to the axis O.

The mounting part 18 to be mounted to the mounting hole 7 of the cutter main body 1 is integrally formed from a metallic material such as steel in a multi-stage cylindrical shape as shown in FIGS. 19A-19E. A front portion (lower portion in FIGS. 19D and 19E) 18a of the mounting part 18 has a disk shape that can be mounted into a portion of the mounting hole 7 which is increased in diameter by one step on the rear end side of the housing portion 7b, a rear end side of the front portion 18a is a tapered portion 18b that is gradually increased in diameter toward the rear end side at a taper angle equal to that of the tapered portion 7e of the mounting hole 7, and a male thread portion 18c which can be screwed to the female thread portion 7c is provided on a rear end side of the tapered portion 18b.

In addition, a rear end side of the male thread portion 18c is a flange portion 18d that has a disk shape and is slightly constricted and then projects to the outer peripheral side. The outer diameter of the flange portion 18d is substantially equal to the outer diameter of the rear end portion of the cutter main body 1. Further, in the present embodiment, the flange portion 18d is provided with a pair of key grooves 18e into which the respective keys 11c of the tip surface of the arbor 11 can be mounted. Incidentally, in the present embodiment, the female thread portion 7c of the mounting hole 7 and the male thread portion 18c of the mounting part 18 are screwed in the same direction as the cutter rotation direction T during cutting, toward the rear end side in the direction of the axis O.

Figure 12:
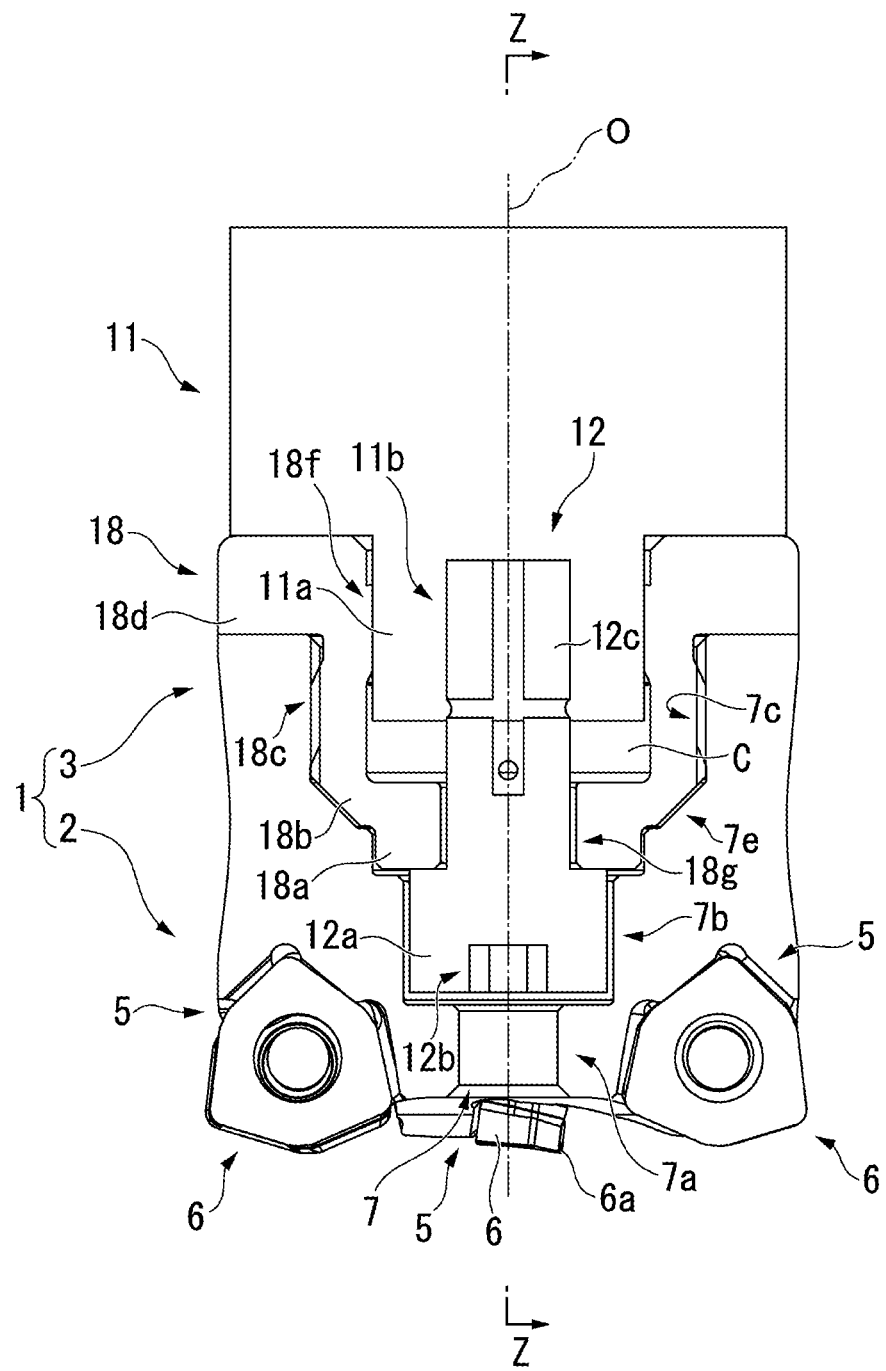
FIG. 12 is a side sectional view of the embodiment shown in FIG. 11.
Figure 13:
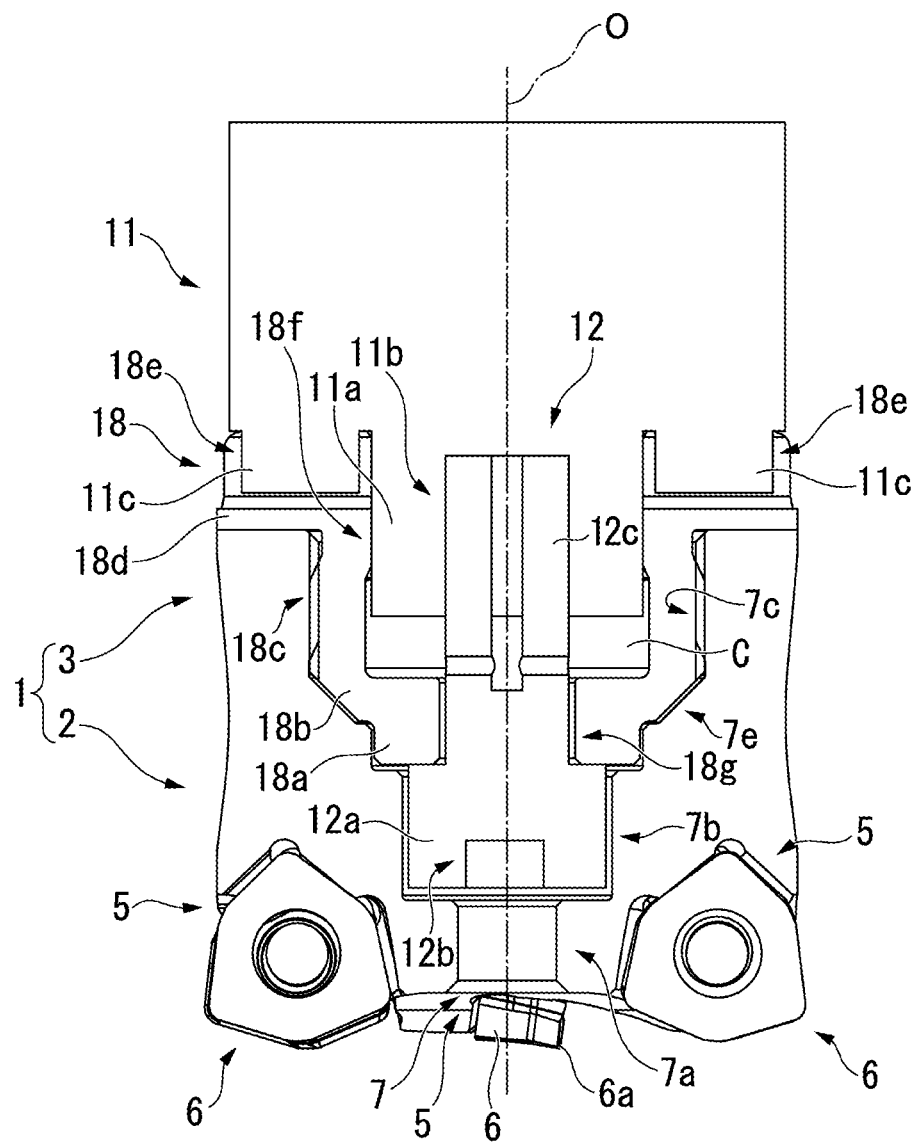
FIG. 13 is a sectional view taken along line Z-Z in FIG. 12.
Figure 14:
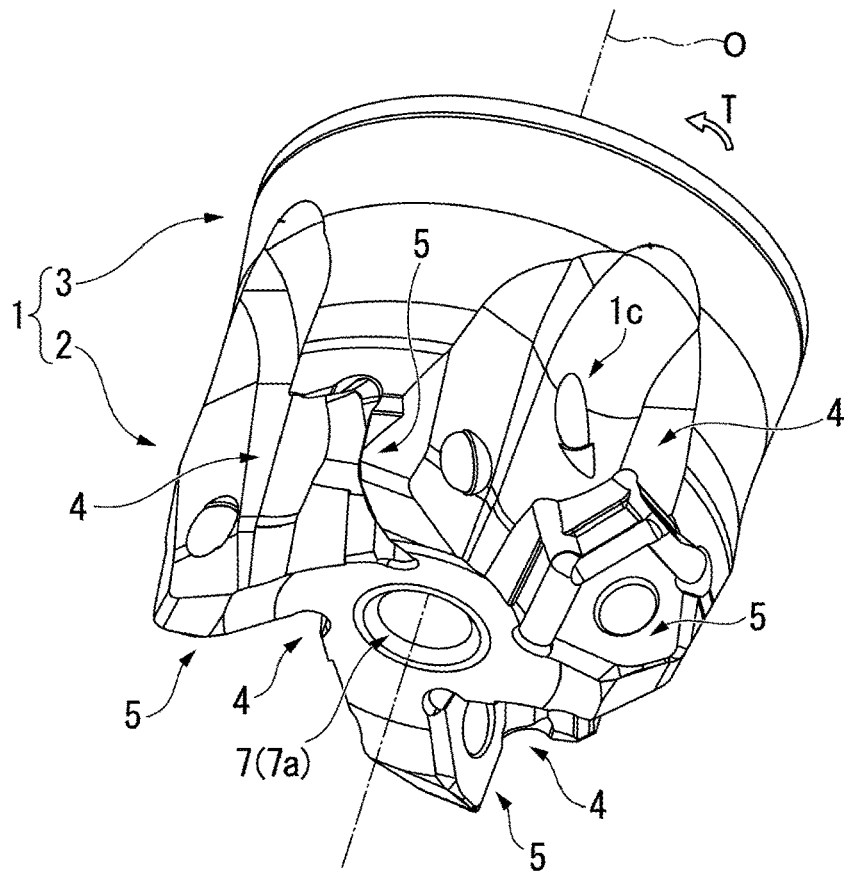
FIG. 14 is a perspective view of the cutter main body of the embodiment shown in FIG. 11.
Figure 15:
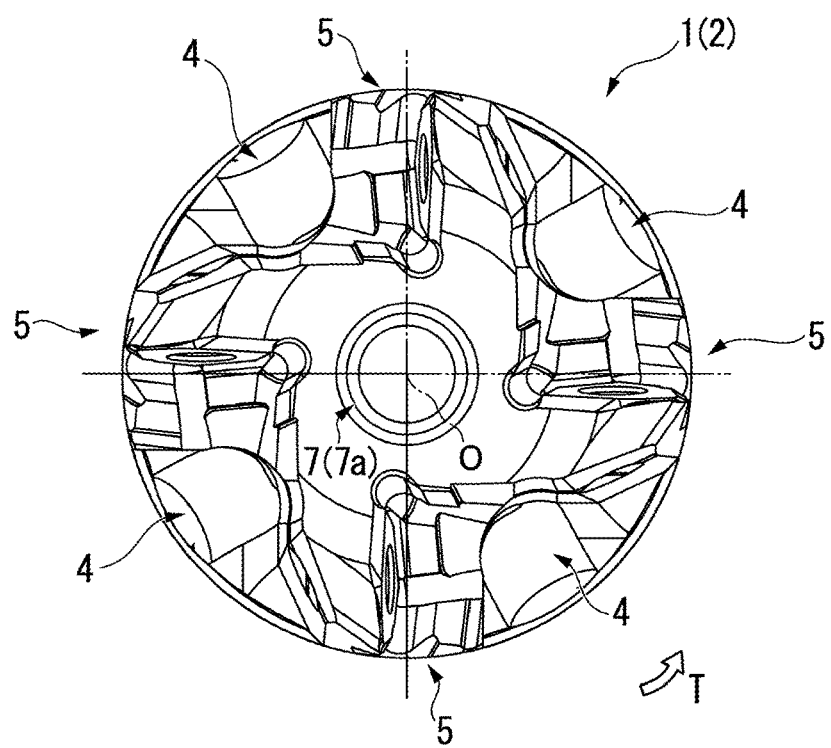
FIG. 15 is a bottom view of a tip surface of the cutter main body shown in FIG. 14.
Figure 16:
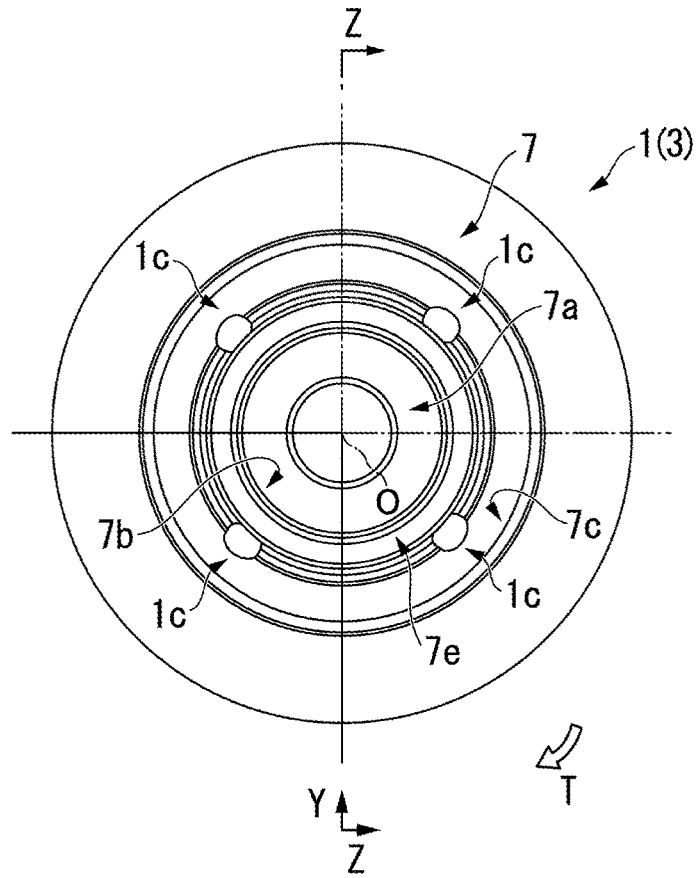
FIG. 16 is a plan view of a rear end surface of the cutter main body shown in FIG. 14.
Figure 17:
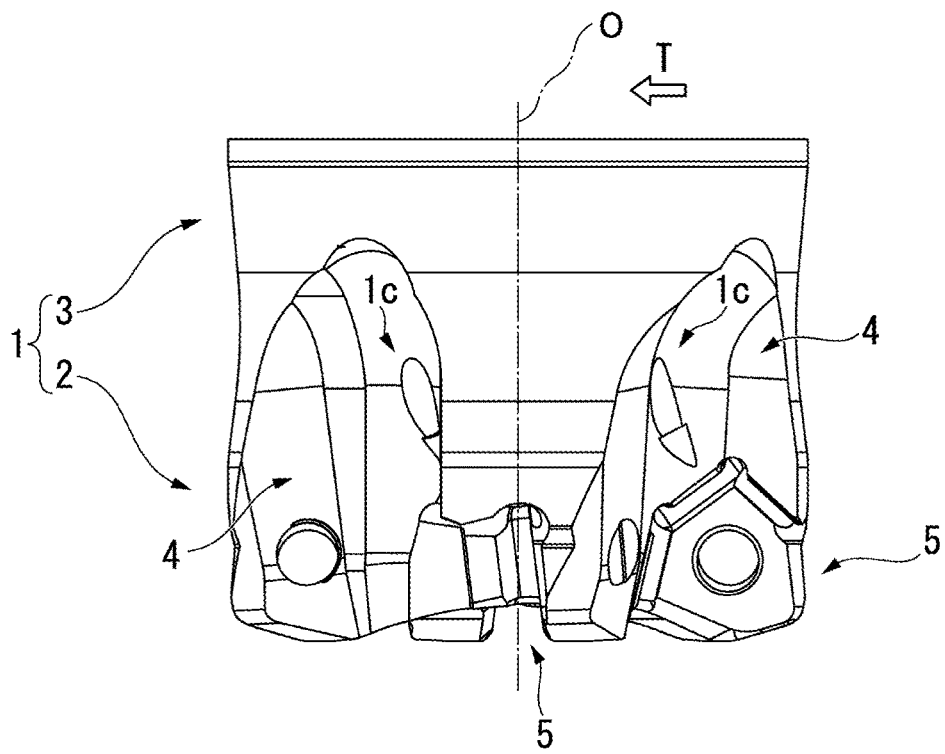
FIG. 17 is a side view as seen in an arrow Y direction in FIG. 16.
Figure 18:
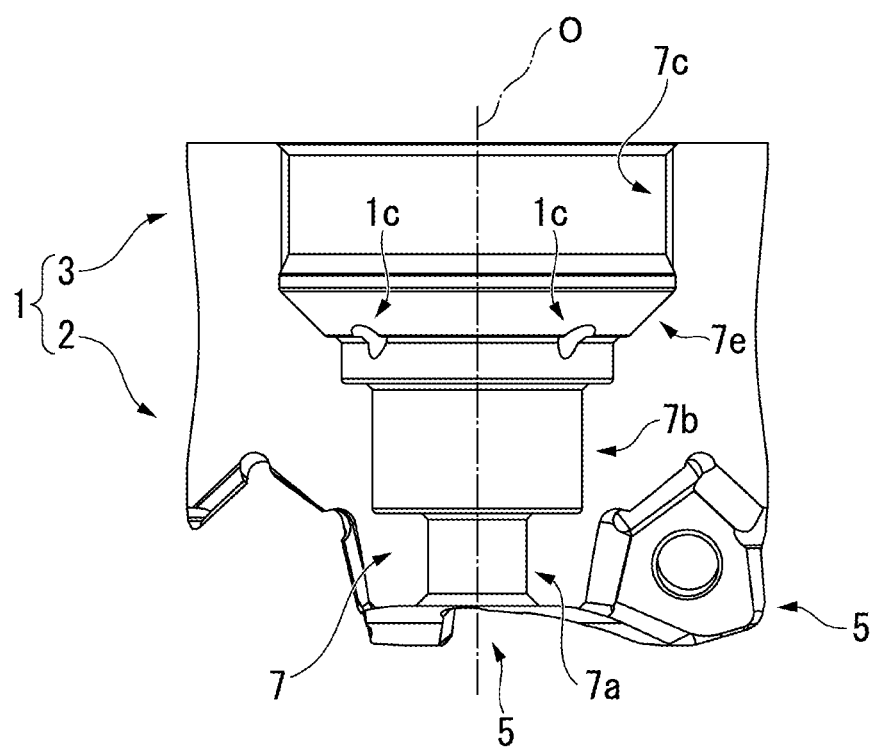
FIG. 18 is a sectional view taken along line Z-Z in FIG. 16.
Figure 19A:
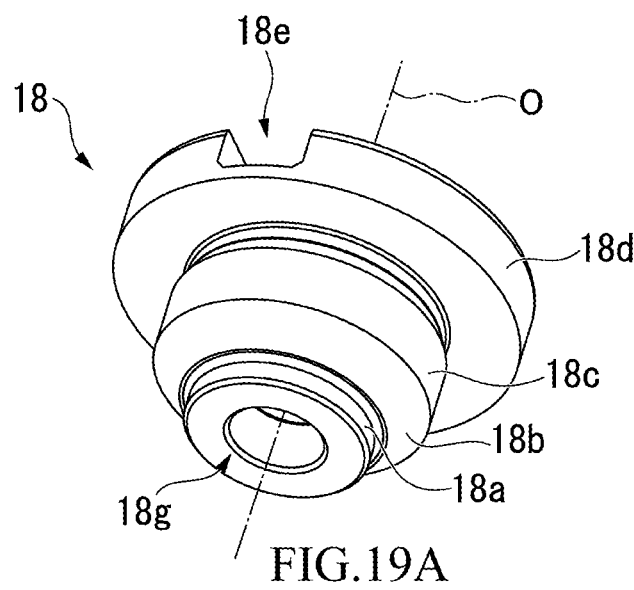
FIG. 19A is a perspective view of a mounting part of the embodiment shown in FIG. 11.
Figure 19B:
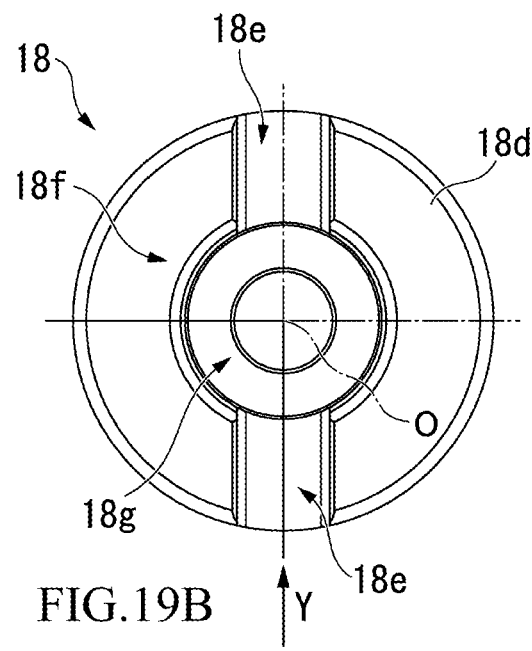
FIG. 19B is a plan view.
Figure 19C:
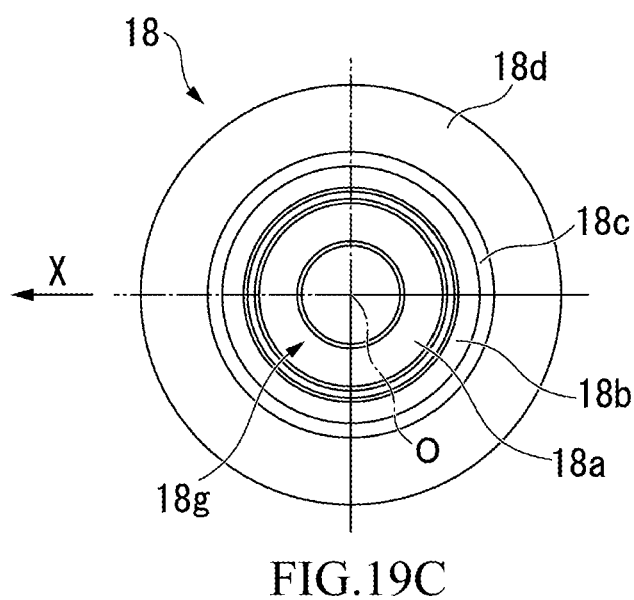
FIG. 19C is a bottom view.
Figure 19D:
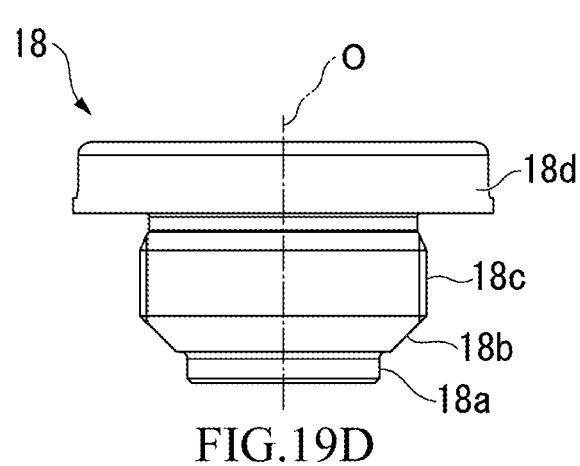
FIG. 19D is a side view as seen in an arrow X direction in FIG. 19B.
Figure 19E:
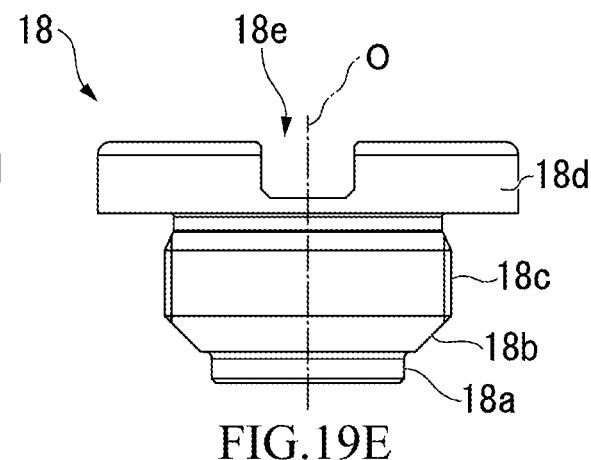
FIG. 19E is a side view as seen in an arrow Y direction in FIG. 19B.

Meanwhile, a rear end portion of an inner peripheral portion of the mounting part 18 is an insertion portion 18f into which the front protruding portion 11a of the arbor 11 is mounted and inserted as shown in FIGS. 12 and 13. The male thread portion 18c of the mounting part 18 is provided in an outer peripheral side of the insertion portion 18f. In addition, a through hole 18g which has a smaller diameter than the insertion portion 18f and the head portion 12a of the headed bolt 12 and into which the thread portion 12c can be inserted is provided from the insertion portion 18f to a tip surface of the mounting part 18 to communicate with the insertion portion 18f.

In a state where the head portion 12a of the headed bolt 12 is housed in the housing portion 7b of the mounting hole 7, the male thread portion 18c is screwed to the female thread portion 7c of the mounting hole 7 while the thread portion 12c of the headed bolt 12 is caused to protrude from the through hole 18g to the insertion portion 18f, so that the mounting part 18 is mounted to the cutter main body 1.

Then, the cutter main body 1 is disposed in the front portion of the arbor 11 in this state, and similar to the first embodiment, the thread portion 12c of the headed bolt 12 is screwed into the thread hole 11b of the arbor 11 by the work tool inserted from the opening portion 7a of the tip of the mounting hole 7, so that the cutter main body 1 is pressed against and mounted to the tip surface of the arbor 11 via the mounting part 18. In this case, in the present embodiment, the keys 11c of the arbor 11 are mounted into the respective key grooves 18e of the mounting part 18, and the flange portion 18d is interposed between the rear end surface of the cutter main body 1 and the tip surface of the arbor 11.

Even in the cutter of the second embodiment having such a configuration, the opening portion 7a which is open at the front end of the cutter main body 1 may have a smaller diameter than the housing portion 7b of the mounting hole 7, and be sized such that the work tool can be inserted into the opening portion 7a. Even in a cutting edge replaceable cutter having a small diameter, interference between the mounting hole 7 and the insert mounting seat 5 can be prevented. In addition, since a minimum number of two components, specifically, the headed bolt 12 and the mounting part 18 are required to mount cutter main body 1 to the arbor 11, the management of the components can be simplified, and only the turning process is sufficient to provide the mounting hole 7 in the cutter main body 1, so that the production of the cutter main body 1 is not also complicated.

Then, also in the present embodiment, the head portion 12a of the headed bolt 12 which has a larger diameter than the thread portion 12c presses and mounts the cutter main body 1 against and to the front portion of the arbor 11 via the mounting part 18 at a position farther away from the axis O than the thread portion 12c. Therefore, a large pressing force can be secured, and the headed bolt 12 can be prevented from loosening, so that the cutter main body 1 can be reliably fixed and mounted to the arbor 11.

Moreover, in the present embodiment, the insertion portion 18f into which the front protruding portion 11a of the arbor 11 is inserted is provided in the mounting part 18, and the male thread portion 18c which is screwed to the female thread portion 7c of the mounting hole 7 of the cutter main body 1 is provided on the outer peripheral side of the insertion portion 18f. Therefore, the male thread portion 18c and the female thread portion 7c can be made to have a larger diameter than that in the first embodiment. Therefore, the mounting part 18 can be more stably mounted to the cutter main body 1, so that the processing accuracy can also be stabilized.

In addition, in the present embodiment, the female thread portion 7c of the mounting hole 7 and the male thread portion 18c of the mounting part 18 are provided to be screwed in the same direction as the cutter rotation direction T during cutting, toward the rear end side in the direction of the axis O. Therefore, even when a cutting load is applied to the mounting part 18, of which the flange portion 18d is interposed between the rear end surface of the cutter main body 1 and the tip surface of the arbor 11, in a direction opposite to the cutter rotation direction T during cutting, the cutting load is applied in a direction in which the male thread portion 18c is screwed to the female thread portion 7c, so that the mounting part 18 can be prevented from loosening. Incidentally, also in the second embodiment, the rotation of the mounting part 18 may be prevented by providing the flat surface portions in the mounting part 18 and causing the anti-rotation screws to come into contact with the flat surface portions.

In addition, in the first and second embodiments, the case has been described in which the present invention is applied to the cutting edge replaceable cutter; however, naturally, the present invention can also be applied to a brazing type cutter in which cutting edge tips provided with the cutting edges 6a are joined to the outer periphery of the front portion of the cutter main body 1 by brazing, or a solid type cutter in which the cutting edges 6a are directly provided on the outer periphery of the front portion of the cutter main body 1.

INDUSTRIAL APPLICABILITY

Even in a cutting edge replaceable cutter having a small diameter, the cutter main body can be reliably mounted to the arbor without increasing the number of components required to mount the cutter main body or complicating the production process of the cutter main body.

REFERENCE SIGNS LIST

1: Cutter main body
1b, 18e: Key groove
2: Cutting edge portion
3: Mounting portion
5: Insert mounting seat
6: Cutting insert
6a: Cutting edge
7: Mounting hole
7a: Opening portion
7b: Housing portion
7c: Female thread portion
7d, 18f: Insertion portion
8, 18: Mounting part
8a, 18c: Male thread portion
8b, 18g: Through hole
8c: Flat surface portion
9: Anti-rotation screw
11: Arbor
11a: Front protruding portion
11b: Thread hole
11c: Key
12: Headed bolt
12a: Head portion
12b: Engaging recessed portion
12c: Thread portion
O: Axis of cutter main body 1
T: Cutter rotation direction

What is claimed is:

1. A cutter comprising:
a cutter main body configured to be rotated around an axis; and
cutting edges disposed on an outer periphery of a front portion of the cutter main body, wherein
a mounting hole is formed in a central portion of the cutter main body, the mounting hole penetrating through the cutter main body along the axis,
the mounting hole includes: an opening portion that is open in a front end of the cutter main body, a housing portion that is provided on a rear end side of the opening portion to house a head portion of a headed bolt, and a female thread portion of which an inner peripheral portion is threaded,
an inner diameter of the opening portion is smaller than an inner diameter of the housing portion and an outer diameter of the head portion,
a mounting part including a male thread portion in an outer peripheral portion thereof is mounted to the female thread portion, the male thread portion being configured to be screwable to the female thread portion, and
a through hole is formed in the mounting part, the through hole being configured such that the thread portion of the headed bolt can be inserted therein in a state where the head portion is housed in the housing portion and having a smaller inner diameter than the head portion.

2. The cutter according to claim 1, wherein
the mounting part is provided with a flat surface portion parallel to the axis, and
an anti-rotation screw, which comes into contact with the flat surface portion, is screwed into the cutter main body.

3. The cutter according to claim 1, wherein
an entirety of the mounting part is housed in the mounting hole, and
a portion of the mounting hole on a rear end side of the mounting part is an insertion portion into which a front protruding portion provided in a front portion of an arbor is inserted.

4. The cutter according to claim 3, wherein the female thread portion of the mounting hole and the male thread portion of the mounting part have a thread pitch smaller than a thread pitch of the thread portion of the headed bolt, or are screwed in a direction opposite to a direction in which the thread portion of the headed bolt is screwed.

5. The cutter according to claim 1, wherein
an outer peripheral portion of a rear end of the mounting part is formed in a flange shape which projects to a rear end surface of the cutter main body,
an inner peripheral portion of the rear end of the mounting part is an insertion portion which communicates with the through hole and into which a front protruding portion of an arbor is inserted, and
the male thread portion is provided on an outer peripheral side of the insertion portion.

6. The cutter according to claim 5, wherein
the female thread portion of the mounting hole and the male thread portion of the mounting part are screwed in the same direction as a rotation direction of the cutter main body during cutting, toward a rear end side in a direction of the axis.

7. A cutter comprising:
a cutter main body configured to be rotated around an axis; and
cutting edges disposed on an outer periphery of a front portion of the cutter main body, wherein
a mounting hole is formed in a central portion of the cutter main body, the mounting hole penetrating through the cutter main body along the axis,
the mounting hole includes: an opening portion that is open in a front end of the cutter main body, a housing portion that is provided on a rear end side of the opening portion to house a head portion of a headed bolt, and a female thread portion of which an inner peripheral portion is threaded,
a mounting part including a male thread portion in an outer peripheral portion is mounted to the female thread portion, the male thread portion being configured to be screwable to the female thread portion,
a through hole is formed in the mounting part, the through hole being configured so the thread portion of the headed bolt can be inserted therein in a state where the head portion is housed in the housing portion and having a smaller inner diameter than the head portion,
the mounting part is provided with a flat surface portion parallel to the axis, and
an anti-rotation screw which comes into contact with the flat surface portion is screwed into the cutter main body.

8. The cutter according to claim 7, wherein
an entirety of the mounting part is housed in the mounting hole, and
a portion of the mounting hole on a rear end side of the mounting part is an insertion portion into which a front protruding portion provided in a front portion of an arbor is inserted.

9. The cutter according to claim 8, wherein
the female thread portion of the mounting hole and the male thread portion of the mounting part have a thread pitch smaller than a thread pitch of the thread portion of the headed bolt, or are screwed in a direction opposite to a direction in which the thread portion of the headed bolt is screwed.

* * * * *